May 19, 1931.  G. E. WEAVER ET AL  1,806,323
LIFTING APPLIANCE
Filed June 9, 1927   5 Sheets-Sheet 2

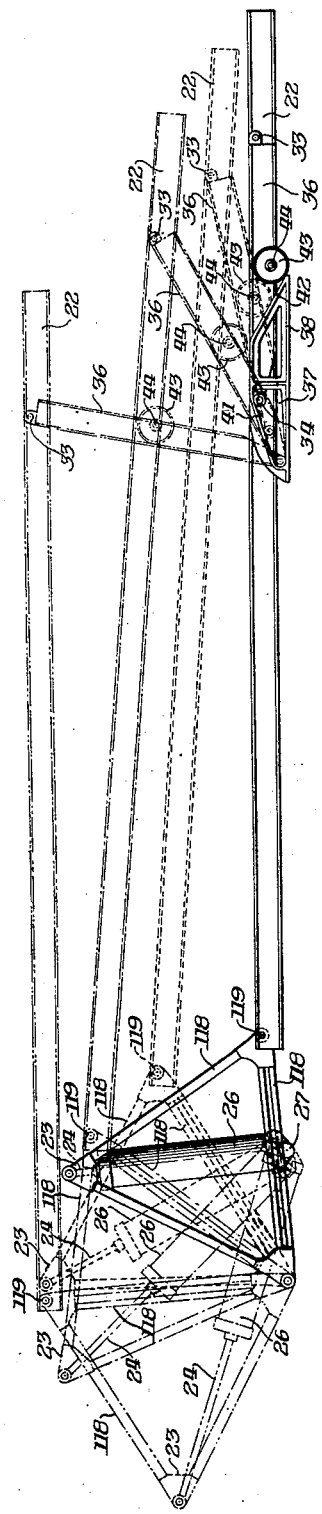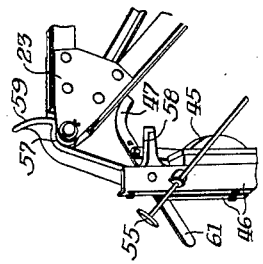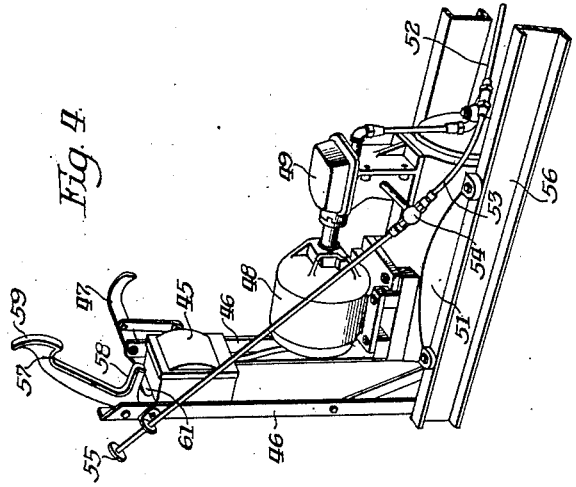

May 19, 1931. G. E. WEAVER ET AL 1,806,323
LIFTING APPLIANCE
Filed June 9, 1927 5 Sheets-Sheet 5

Patented May 19, 1931

1,806,323

UNITED STATES PATENT OFFICE

GAILARD E. WEAVER AND ALBERT R. SQUYER, OF SPRINGFIELD, ILLINOIS, ASSIGNORS TO WEAVER MANUFACTURING COMPANY, OF SPRINGFIELD, ILLINOIS, A CORPORATION OF ILLINOIS

LIFTING APPLIANCE

Application filed June 9, 1927. Serial No. 197,689.

Our invention concerns features of betterment in automobile elevating appliances whereby the cars may be quickly, easily and safely raised to a convenient height for greasing, washing and repairs under the car, and one of our aims is to provide a structure of this character which is a self-contained unit so that it may be placed anywhere in or out of a service station, on the ground or on a floor, where a supply of electricity is available, and it is then ready for operation as soon as it is connected in the electric circuit.

The apparatus elevates the car by engagement therewith beneath its front axle and its rear-axle housing, leaving the wheels free to turn for removing tires, adjustment of brakes, bearings, etc., the space inside of the frame structure being unobstructed, thus rendering the under side of the car readily accessible for the convenient making of needed repairs.

The structure is so designed and made that when the automobile is lifted to its extreme height very little power or force is necessary to maintain it in that relation, and it is additionally provided with a safety hook to eliminate any possible danger to a workman who may be beneath the car, should the lifting or other holding mechanism fail in service.

As will be noted from what has been stated above, the points of lifting contact with the automobile are not on the tires, as is ordinarily the case with devices of this kind, but the lift is effected directly against the lower part of the differential housing on the rear axle and at two points transversely spaced apart on the front axle, thus providing ample stability for the car when it is in its hoisted relation and affording a more accessible way to the under side of the car.

The manner of accomplishing the foregoing stated and other desirable objects and functions will be readily understood by those skilled in the art from a study of the preferred embodiments thereof presented in the accompanying drawings forming a part of this specification, and throughout the views of which, for simplicity, like reference characters have been used to designate the same structural elements.

In these drawings,—

Fig. 4 is a perspective view of a part of the apparatus at the front end of the appliance;

Fig. 5 is a perspective view of the safety hook and the electric-switch handle and a portion of the triangular frame;

Figure 1:
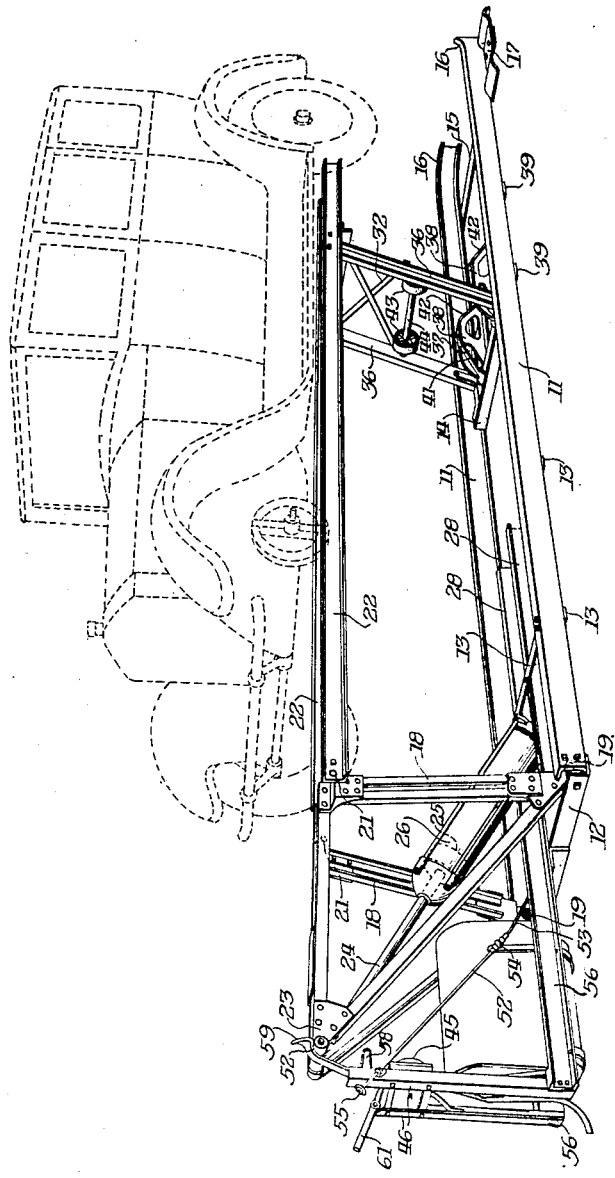
Fig. 1 shows one embodiment of the invention in perspective, with the automobile illustrated by dotted lines in elevated or lifted position.

Fig. 6 is a somewhat diagrammatic view of a slightly modified form of the apparatus, showing the load or lifting frame in four different positions, one in full lines, the next in dotted lines, the third in dot and dash lines, and the fourth in double-dot and dash lines, this figure substantially correctly illustrating these different positions for both embodiments of the invention; and Figures 7, 8, 9 and 10 present modified or additional structural features.

Referring to these drawings, it will be apparent that the new and improved appliance includes a base or main frame adapted to rest on the ground or floor, and comprising a pair of lengthwise, parallel, channel-bars 11, 11 connected together at intervals by cross-bars 12, 13, 14 and 15, such longitudinal elements 11, 11 being bent toward one another at one end at 16, 16 to aid the chauffeur in properly positioning the automobile preliminary to its elevation, a pair of transversely-aligned, stationary saddles or chucks 17, 17 having depressions between spaced lateral elevations or ribs, being mounted on the protruding ends of the flat cross-bars 15, only one of such saddles being shown in the drawings, the other being similarly located at the oposite side of the structure.

A duplex or double, triangular frame 18, 18 is fulcrumed at one lower corner 19, 19 to one end of the main or base frame, another corner 21, 21 being hinged to the front ends of a pair of parallel, spaced channel-bars 22, 22 suitably cross-connected together to form a frame and adapted to be elevated to raise the automobile, the apex 23 of the three-sided frame 18, 18 having pivotally connected thereto the plunger rod 24 of a plunger or piston 25 reciprocatory in a cylinder 26 rockingly mounted at its lower end at 27 on a pair of short, base, longitudinal, channel-bars 28, 28 secured in any approved manner to the base-frame referred to.

Near their other ends these bars 22, 22 are cross-connected together by a grid 31 (Fig. 2) designed to contact with and lift the rear axle of the automobile by direct engagement with the bottom of its differential or rear-axle housing.

A wide, skeleton-frame link characterized as a whole 32, having diagonal, crossed braces, is hinged at its upper end by a cross-shaft 33 (Fig. 2) to both bars 22, 22, its lower end being equipped with a pair of rollers 34 on a cross-shaft joining together the lower ends of the two side bars 36, 36 of which the link 32 is principally composed, such shaft 35 extending through registering apertures 37, 37 in a pair of tranversely-registering, stationary cam-blocks 38, 38 mounted on cross-bars 39, 39 forming parts of the base-frame previously mentioned, these rollers being located beneath and coacting with inclined, cam tracks 41, 41 of such blocks, the latter having oppositely-inclined, cam tracks 42, 42, coacting with which are a pair of wheels 43, 43 on a shaft 44 cross-connecting together the two link-bars 36, 36 about midway of their length.

At its other end, the apparatus has an encased electric-switch 45 mounted on an upright or standard 46, rising from an extension 56 of the main frame, and both forming a part thereof, and operated by a curved, pivoted handle 47, such switch controlling the operation of an electric-motor 48 direct-connected to an oil-pump 49 in communication with an oil-tank 51, from which it receives its supply of oil, the motor, pump and tank being appropriately mounted on the frame, as is clearly depicted.

The pump delivers its oil through a pipe or tube 52, a portion only of which is shown, to the cylinder 26 below its plunger 25, whereby the action of the pump causes the oil under pressure to force the plunger upwardly to do its work, as will be readily understood.

A branch or by-pass pipe 53, fitted with a valve 54 actuated by a readily-accessible handle 55, is designed to permit the oil in the cylinder to be drained slowly back into the tank when the valve is open, thus allowing the plunger to descend gradually.

As a safety precaution against the frame collapsing or descending accidentally or unintentionally, a hook 57 of appropriate shape, and having a tail 58, is pivoted at the top of the upright 46 and is designed to be rocked back automatically as the triangular frame contacts with its curved, front face 59, and then descend by its weight and engage over the shaft by which the plunger rod 24 is rockingly connected to the frame. The tail 58 is intended to engage the top apex of the triangular frame to prevent the apparatus from going beyond center and falling forward should all other means of precluding this occurrence fail.

Figure 2:
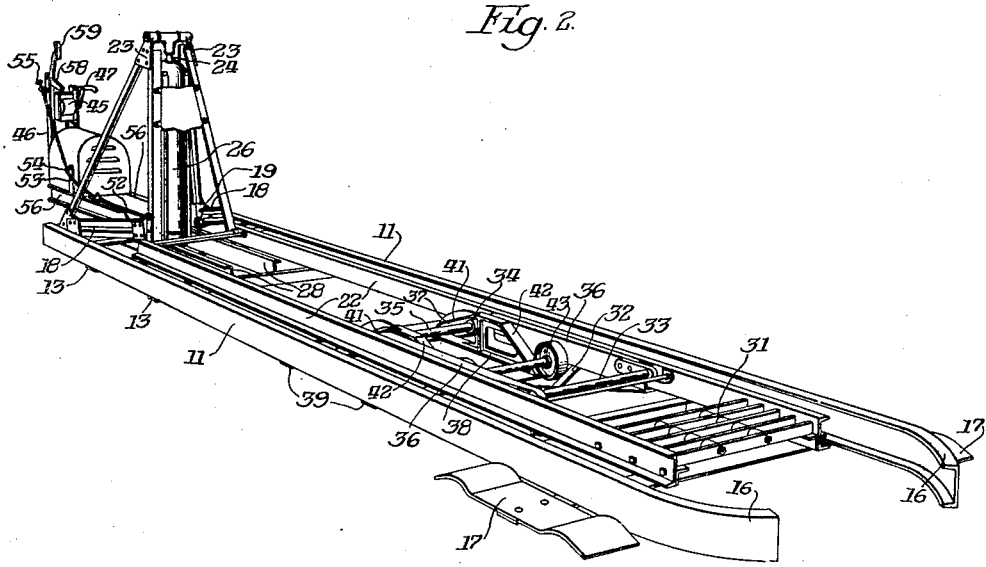
Fig. 2 is a perspective view of the lifting apparatus from its opposite end when the load-lifting frame is in its depressed position.

The apparatus operates practically as follows:

Assuming that the frame as a whole is in collapsed condition, with the bars 22, 22 of the supplemental or load frame between the base-frame bars 11, 11, as shown in Fig. 2, the chauffeur, even though timid, easily drives the automobile astride the appliance, being aided in this action by the incurved ends 16 of the bars 11, until its rear wheels rest in the saddles or seats 17, which insure a correct positioning of the differential housing or casing over the center of the grid or grating 31, regardless of the make or size or wheelbase length of the automobile.

Owing to the central depressions or cavities in such seats, the driver of the car can readily determine by the feeling or movement of the automobile when the rear wheels have entered such shallow pockets designed to receive them, which assures him of the correct positioning of the car for a subsequent elevation.

Oil-valve 54 having been closed by the turning of its handle 55, the operator raises the handle 47, thereby closing the electric-switch 45 and setting the electric-motor 48 and its connected pump 49 into action, the pumped oil delivered into the pump from the tank being fed through pipe 52 into cylinder 26 beneath its piston 25, which is thereby caused to slowly ascend under suitable operating pressure.

The upward movement of the plunger and its rod rocks or turns the duplex, triangular frame upwardly around its front hinge connections 19, the cylinder at the same time swinging around its pivotal mounting 27, with the result that the front end of the load frame, composed principally of the bars 22, 22, rises more rapidly than its rear end, as shown in the first dotted-line positions of the parts, as indicated in Fig. 6, and, during such elevation, the front sections of the bars 22, 22 come up under the front axle of the car and begin to raise it.

As the bars 22 thus move simultaneously upwardly and forwardly, the front end of the rear, wide link 32 descends somewhat by reason of its rollers 34, 34 traveling down the under surfaces of the forwardly-inclined cams or tracks 41, 41, and, of course, during the same action, the rear end of link 32 is being elevated due to the travel of the rollers 43, 43 up the inclined tracks 42.

In this connection it will be observed that the front end of the load frame is raised more rapidly than its rear end because of the forward travel of the fulcrum of the rear link. These initial movements of the connected mechanical elements permit the operating means, with the expenditure of relatively little power, to break or overcome the original dead-center association of such members.

As the plunger in the cylinder continues its upward sliding movement, the triangular frame is rocked to a position wherein its side, which was at first horizontal, is then in substantially vertical, or possibly slightly beyond upright, position.

During this part of the action of the apparatus, the rear end of the load frame ascends more rapidly than its front end, so that in its final position it is in practically horizontal relation, it being understood, of course, that as the grid or grate 31 rises it contacts with the under side of the differential housing of the car and lifts it without injury to the associated truss rods, etc.

These relations of the elements as they continue and complete their motions are further represented in Fig. 6 by dot and dash and double-dot and dash line showings.

During the first of this operation, when the rollers 34 reach the bottom of the co-operating, inclined cam-surfaces, they come to a complete stop by engaging the abutting end wall of such cams, at which time the wheels 43 will have arrived at the tops of their sloping tracks 42, the mechanical elements involved being so related, and the previous dead-center arrangement of the parts having been sufficiently overcome, that the power or force exerted by the cylinder and plunger will be ample to complete the remainder of the elevating movement of the rear part of the apparatus.

The purpose or object of raising the front part of the lifting or load frame first is to allow the bars 22, 22, forming parts of such frame, a little more leverage on, or more favorable angular relation to, the rear, supporting link 32, which is thereafter swung up directly by the combined upward and forward movements of the load frame.

When the triangular frame substantially reaches its limit of rocking movement, it strikes and depresses the handle 47, thereby opening the electric-switch and shutting off the motor and pump, and, at about the same time, the same frame engages the catch 57 and causes it to automatically lock or latch the elevated frame in raised position, thus eliminating all danger of undesigned or casual descent or drop thereof.

It may be observed that the cylinder and its plunger are mounted in such a manner that they have their greatest lifting effort, just as the rollers 43 leave their inclined trackway 42, 42, and it will be perceived that when the automobile-supporting frame approaches its full elevation, the cylinder and its plunger and rod are almost parallel to one side of the triangular frame, thereby moving the load at a faster rate than previously.

Since the structure is so made that the front end of the lifting or load frame is raised first or in greater degree during the first part of the operation, it is obvious that some provision must be made to cause such frame to assume a level disposition when fully elevated, and, in this device, such result is accomplished by making the rear link 32 slightly longer than that side of the triangular frame which stands practically or almost vertically when the load is raised to the limit, thus causing the rear part of the load frame to be elevated more rapidly than its front part just as soon as the bodily forward travel of the rear link is arrested by its rollers 34 reaching the end of their cam tracks 41, so that thereafter such link swings around a fixed center or axis which previously thereto was traveling forwardly.

Figure 3:
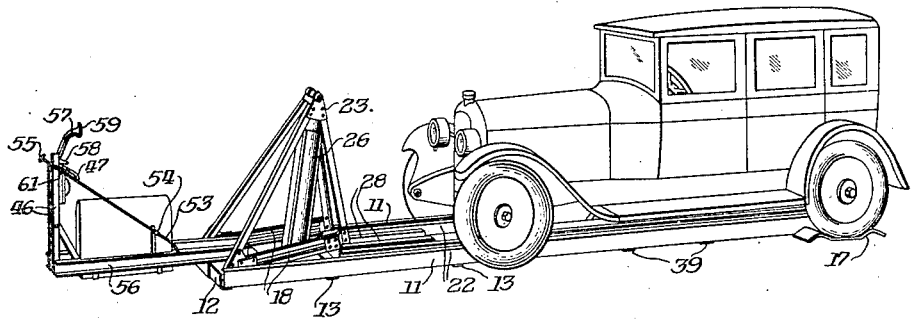
Fig. 3 is a perspective view with the elevating appliance in lowered relation, and shows the automobile astride the main frame in proper position to be lifted.

To lower the automobile and its supporting frame it is merely necessary for the operator to release or raise the hook 57 manually and open the valve 54 by means of its handle 55, thus enabling the oil in the cylinder to flow back slowly into the storage tank 51, during which operation the frame as a whole will gradually collapse and deposit the automobile on the ground or floor in its original position, as shown in Fig. 3.

The appliance illustrated in Fig. 6 is substantially the same as that presented in the other figures except that the double, triangular frame 118 is of somewhat different shape, being approximately equilateral, whereas the frame in the other embodiment of the invention is substantially of right-angle formation.

Figure 7:
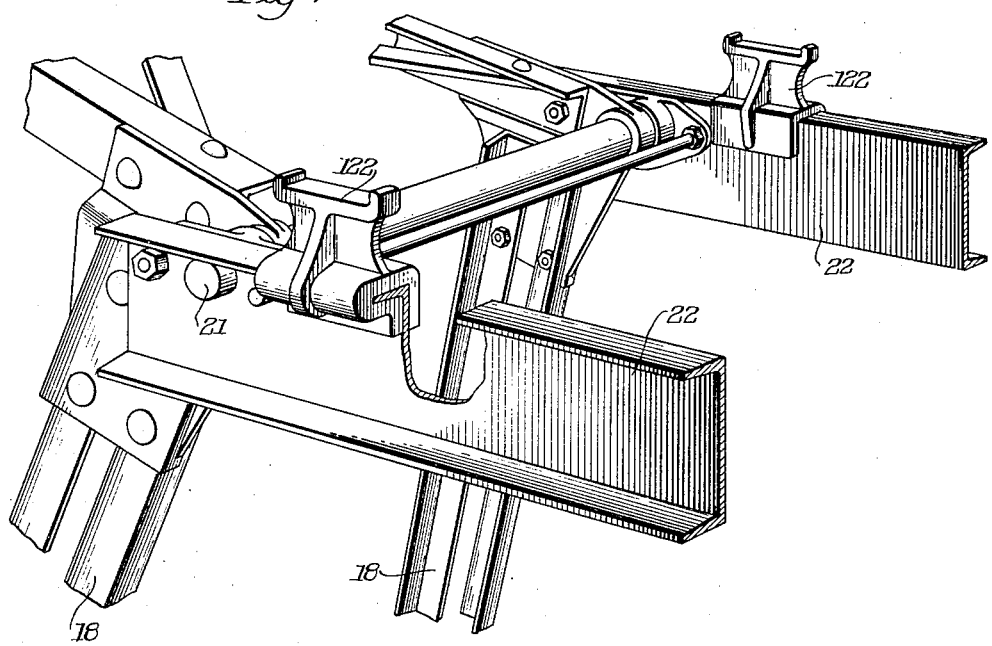

In some cases, it may be desirable to have blocks on the bars 22, 22 to engage the front axle, and in Fig. 7 such a structure has been shown fragmentarily in perspective.

The blocks 122, 122 are slidably mounted on the channels 22, 22 and may be moved to the required positions to properly register with the front axle of the vehicle.

Figure 8:
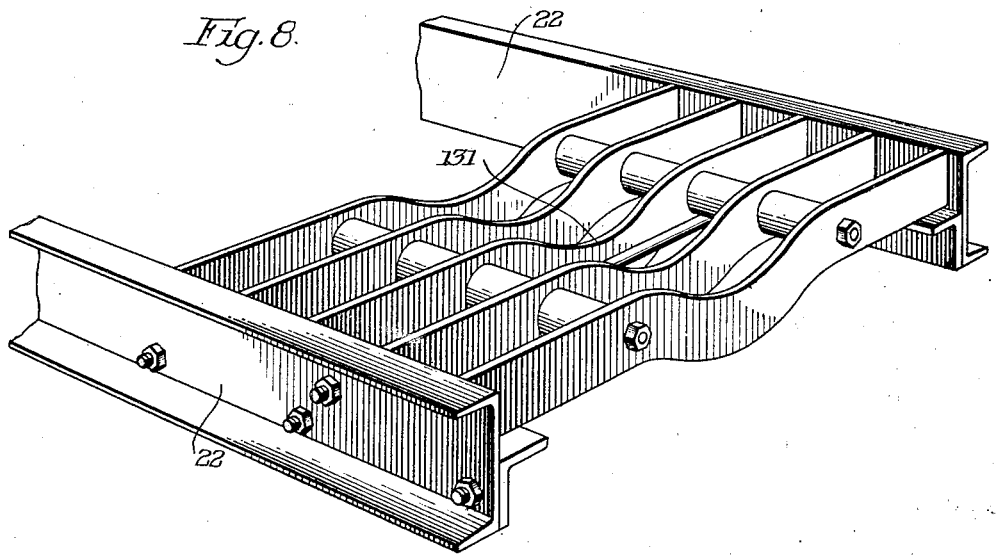

In other instances, it may be better to make the grid or grating 31, composed of parallel, transverse, spaced bars or plates, slightly depressed at its center to conform somewhat to the shape of the rear-axle housing, and in Figure 8 such a construction 131 has been presented in perspective, the depression accommodating and centering the rear-axle housing and the spacing apart of the grating elements preventing interference with any truss-rods or the like.

Figure 9:
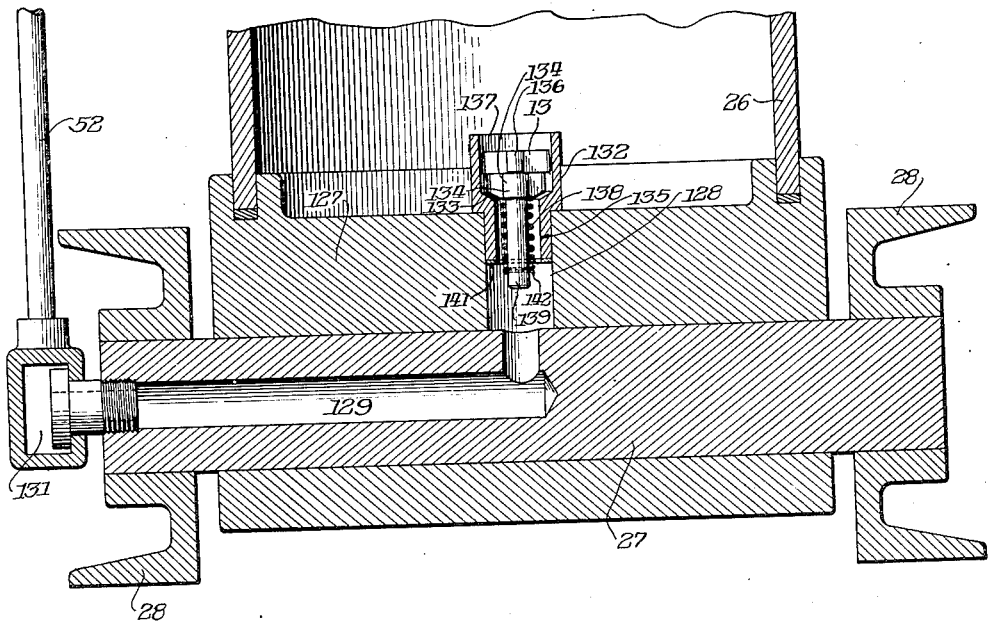
Figure 10:
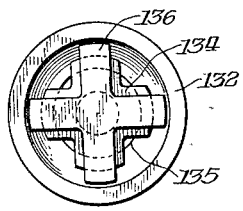

As a safety precaution, in some installations, it is advisable to equip the lower end of the cylinder 26 with a valve which will preclude a too rapid descent of the vehicle-raising structure, and such a means is portrayed in Figures 9 and 10, the former being a fragmentary central section through the lower part of the cylinder and the latter a top plan view of the valve proper.

Such valve includes a hollow plug 132 fitted in the passage 128 in the cylinder-base 127 which connects with the conduit 129 in the hinge-shaft 27, a rocking connection 131 being provided between the passage 129 and pipe 52 joined to the pump.

Internally the member 132 has a tapered valve-seat 133 with which cooperates a correspondingly-sloping valve 134 of cross-shape in cross-section whereby the valve-port 135 is always partly or slightly open, even though the valve is in closed position on its seat, the upper end of the valve having a large cross-shaped guiding-section 136 sliding in the cavity 137.

The valve includes also a coiled spring 138 surrounding its shank 139 and bearing at its upper end on the valve and at its lower end on an apertured disc 141 secured to the lower end of the plug, the valve-stem having a cotter-pin 142 which limits the opening movement of the valve.

Such valve is normally hold open by its spring, both during the admission of the oil through its port into the cylinder and also during its outward flow therethrough at the customary rate, during the lowering of the vehicle.

If, however, through accident to the piping or for any other reason, the load tends to descend too rapidly causing an abnormal oil pressure on the valve, the latter will be pressed to its seat and retard the rate of oil discharge so that the load cannot come down with too great speed, thus assuring against its falling or dropping.

Such valve might be more or less aptly characterized as a leaky check-valve.

Those acquainted with this art will readily understand that this invention, as defined by the appended claims, is not limited to these particular embodiments, and may be incorporated in physical form in a variety of ways, all possessing the fundamental principles involved, but differing more or less in structural details.

We claim:

1. In an automobile lifting-appliance, the combination of a main-frame, a load-lifting frame adapted to engage the under side of an automobile and to raise and lower it, a triangular front frame hinged at one angle to said main-frame and hinged at an adjacent angle to said load-lifting frame, a cylinder rockingly mounted at its lower end on said main-frame, a plunger reciprocatory in said cylinder, a plunger-rod connected to said plunger and hinged at its other end to the third angle of said triangular frame, an electric-motor on said main-frame, a pump operated by said motor, a fluid supply-tank, a conduit connecting said tank to said pump, a conduit connecting said pump to said cylinder below said plunger therein, a valve-controlled by-pass connecting said conduits together around said pump, an electric-switch in the circuit of said electric-motor, means to open said electric-switch automatically when said load-lifting frame reaches its uppermost position, a hook on said main-frame arranged to engage said triangular front-frame automatically when said load-lifting frame reaches its uppermost position to prevent unintentional descent of the latter, a rear link longer than the corresponding side of said triangular frame pivotally connected at its back end to said load-lifting frame, a first downwardly forwardly inclined cam-track means terminating in an abutment, roller means at the lower end of said rear link cooperating with said cam-track means, a second upwardly forwardly sloping cam-track means, and roller means on an intermediate portion of said rear link coacting with said second cam-track means, whereby when the motor is operated the pumped fluid forces said plunger upwardly causing the elevation of the front part of said load-lifting frame at first more rapidly than its rear part, the final elevated position of said load-lifting frame being substantially horizontal.

2. In an automobile lifting-appliance, the combination of a main-frame, a load-lifting frame adapted to engage the under side of an automobile and to raise and lower it, a triangular front-frame hinged at one angle to said main-frame and hinged at an adjacent angle to said load-lifting frame, means to rock said triangular frame around said first-mentioned hinge, a rear link longer than the corresponding side of said triangular frame pivotally connected at its back end to said load-lifting frame, a first downwardly forwardly inclined cam-track means terminating in an abutment, roller means at the lower end of said rear link cooperating with said cam-track means, a second upwardly forwardly sloping cam-track means, and roller means on an intermediate portion of said rear link coacting with said second cam-track means, whereby when said triangular frame is rocked causing the elevation of the load-lifting frame its front part at first rises more rapidly than its rear part, the final elevated position of such frame being substantially horizontal.

3. The combination of a vehicle lifting and lowering frame, and means to raise and to lower said frame including a cylinder, a plunger slidable therein, a leaky check-valve controlling a port into said cylinder, a spring normally maintaining said valve open, means to force a fluid under pressure into said cylinder through said port to raise said frame by the resulting travel of the plunger, and means to effect the discharge of such fluid from the cylinder to permit the descent of said frame, said valve automatically moving to its seat and thereby restricting the rate of fluid delivery through its port if the frame tends to descend abnormally rapidly.

4. The combination of a vehicle lifting and lowering frame, and means to elevate and to lower the frame, the latter having a transverse grating composed of spaced elements and having a depression in its top to receive the differential housing of the vehicle, the spaces between the elements accommodating any truss-rod means associated with said housing.

5. In an automobile lifting-appliance, the combination of means to engage and to elevate an automobile, a front link connected to said means and having a fixed-position lower fulcrum, a rear link connected to said means, a mounting for the lower fulcrum of said rear link permitting such link to travel forwardly during the first portion only of the swinging action of such link, cam means causing such swinging action during the travel of such fulcrum, and means to actuate said links to raise and to lower said elevating means.

6. The combination of a vehicle-lifting frame, means to raise and lower said frame including a cylinder and a plunger slidable therein, means to force a liquid under pressure into said cylinder to raise said frame by the resulting travel of said plunger, means to permit delivery of said liquid from said cylinder to allow descent of said frame, an automatically-acting check-valve in said cylinder controlling the discharge of such fluid and consequently the rate of descent of said frame, and means tending to normally maintain said check-valve open.

GAILARD E. WEAVER.
ALBERT R. SQUYER.